2,938,025
PRODUCTION OF METHYL 3-O-CARBAMYL-α-NOVIOPYRANOSIDE

Clifford H. Shunk, Westfield, and Karl Folkers, Plainfield, N.J., assignors to Merck & Co., Inc., Rahway, N.J., a corporation of New Jersey No Drawing. Filed Dec. 26, 1957, Ser. No. 705,113

7 Claims. (Cl. 260—210)

This invention relates to new sugar-like compounds and processes of obtaining the same. More particularly, it is concerned with methyl 3-O-carbamyl-α-noviopyranoside and processes of obtaining the same.

The product methyl 3-O-carbamyl-α-noviopyranoside having the formula:

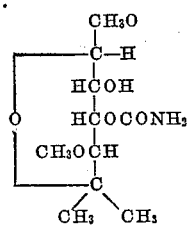

is useful as an intermediate in the synthesis of novobiocin.

It is an object of the present invention to provide a novel intermediate product useful in the synthesis of methyl 3-O-carbamyl-α-noviopyranoside. In addition, it is an object to provide processes useful for producing methyl 3-O-carbamyl-α-noviopyranoside starting with methyl-α-noviopyranoside. Other objects will be apparent from the detailed description hereinafter provided.

The processes of the present invention can be shown structurally as follows:

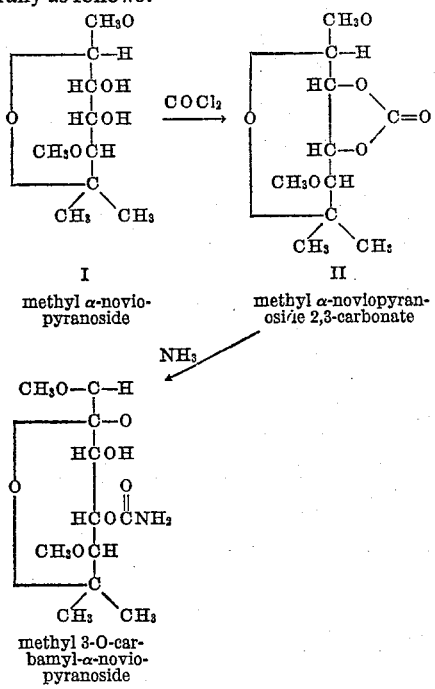

In accordance with this reaction scheme the starting material methyl-α-noviopyranoside is first reacted with phosgene to produce the corresponding carbon derivative which is then reacted with ammonia to produce the desired carbamyl compound. The first step of this process is effected by intimately contacting methyl-α-noviopyranoside with phosgene in the presence of an acid acceptor. Although various basic substances can be used as the acid acceptor in this process, we prefer to use a tertiary amine such as pyridine for this purpose. The reaction is most conveniently effected in a suitable solvent medium for the reactants such as dioxane. After completion of the reaction, the product is readily recovered by concentrating the reaction mixture and extracting it with a suitable solvent such as chloroform.

The second step of the process is readily carried out by intimately contacting methyl-α-noviopyranoside 2,3-carbonate with ammonia. This reaction is most conveniently effected in a suitable solvent medium such as methanol, ethanol and the like. After completion of the reaction the product is recovered by concentration and crystallization of the residue from a suitable solvent such as ethyl ether.

The following examples illustrate the processes of this invention.

EXAMPLE 1

*Methyl-α-noviopyranoside 2,3-carbonate*

Methyl-α-noviopyranoside (1.00 g.) was dissolved in 10 ml. of dry pyridine; the solution was cooled in an ice bath, and 6.2 ml. of dioxane containing 0.45 g. of phosgene was added. A yellow precipitate separated. After stirring at room temperature overnight, the mixture was concentrated under reduced pressure and ice water was added to the residue. The mixture was extracted with chloroform and the extract was washed with two portions of water, dried over magnesium sulfate, filtered and concentrated leaving 0.95 g. of methyl-α-noviopyranoside 2,3-carbonate as an oil. A portion was evaporatively distilled at about 80° C./0.01 mm., $[\alpha]_D^{27} = -33°$ (c.=1.5 in methanol).

*Analysis.*—Calcd. for $C_{10}H_{16}O_6$: C, 51.70; H, 6.94. Found: C, 51.87; H, 6.78.

EXAMPLE 2

*Methyl-3-O-carbamyl-α-noviopyranoside*

Distilled methyl-α-noviopyranoside 2,3-carbonate (119 mg.) was dissolved in 12 ml. of methanol containing 170 mg. of ammonia. The solution was kept at room temperature for 22 hours after which it was concentrated under reduced pressure. Ether was added to the residual oil giving a crystalline precipiate, M.P. 178–183° C., wt. 40 mg. Recrystallization of the solid gave methyl 3-O-carbamyl-α-noviopyranoside, M.P. 189–192°.

The methyl 3-O-carbamyl-α-noviopyranoside can be converted to 3-O-carbamylnoviose which is an intermediate useful in the synthesis of novobiocin. Thus, this compound which is also called 3-carbamyl-4-methyl-novobiose can be used in the synthesis of novobiocin and other novobiocin-like compounds in accordance with processes described in co-pending applications Serial No. 579,130, filed April 19, 1956, now abandoned, and Serial No. 705,139, filed December 26, 1957. For example, reaction of methyl 3-O-carbamylnoviose with acetic anhydride in the presence of sodium acetate at 100° C. produces the diacetylated derivative and reaction of the latter compound with anhydrous hydrogen chloride at a temperature of 0° C. affords 1-chloro-2-O-acyl-3-O-carbamylnoviose. Reaction of this produce with 3-(3 - [γ,γ - dimethylallyl] - 4 - acetoxybenzamido) - 4,7-dihydroxy-2-methylcoumarin in the presence of silver oxide and hydrolysis of the condensation product with sodium hydroxide affords novobiocin. The 3-(3-[γ,γ-dimethylallyl]-4-acetoxybenzamido) - 4;7 - dihydroxy - 8-methylcoumarin is prepared by reacting 2-methyl resorcinol with ethylcyano acetate in the presence of zinc chloride and hydrogen chloride at about 0° C. to produce 7-hydroxy-4-imino-8-methyl-2-oxochroman, hydrolyzing this compound with 50% sulfuric acid at about 100° C. to obtain 4,7-dihydroxy-8-methylcoumarin, treating this compound in aqueous solution with sodium nitrite to produce 2,4-dioxo-7-hydroxy-8-methyl-3-oximinochroman, reducing this compound with hydrogen in the presence of palladium on charcoal to obtain 3-amino-4,7-dihydroxy-8-methylcoumarin, and condensing this compound with 3-(γ,γ-dimethylallyl)-4-acetoxybenzoyl chloride in water in the presence of sodium acetate. The 3-(γ,γ-dimethylallyl)-4-acetoxybenzoyl chloride is prepared by reacting ethyl p-hydroxybenzoate with γ,γ-dimethylallyl bromide in toluene in the presence of sodium to obtain ethyl 3-(γ,γ-dimethylallyl-4-hydroxybenzoate, hydrolyzing this compound with sodium hydroxide to produce the free acid, acetylating this compound by reaction with acetic anhydride in the presence of pyridine to obtain the 4-acetoxy compound, and reacting the sodium salt of 3-(γ,γ-dimethylallyl)-4-acetoxybenzoate with oxallyl chloride.

The conversion of methyl 3-O-carbamyl-α-noviopyranoside to 3-O-carbamylnoviose can be carried out as follows:

Methyl 3-O-carbamyl-α-noviopyranoside (1.5 g.) was heated on the steam bath in 150 ml. of 0.1 N hydrochloric acid about forty-five minutes or until the rotation of the solution reached a constant value. The observed rotation of the solution at the end of this time was +0.50° in a 1 dm. tube (D line of sodium used). The resulting solution was lyophilized to produce the 3-O-carbamylnoviose as a glass. $[\alpha]_D^{22} = +46$ (c. 1 in methanol). This product reduces Benedict's solution.

The methyl-α-noviopyranoside used as the starting material in the process of the present invention can be prepared in accordance with processes described in co-pending application Serial No. 705,110, filed December 26, 1957. Thus, methyl 2,3-isopropylidene-L-rhamnofuranoside can be converted to methyl α-noviopyranoside by reactions which can be shown as follows:

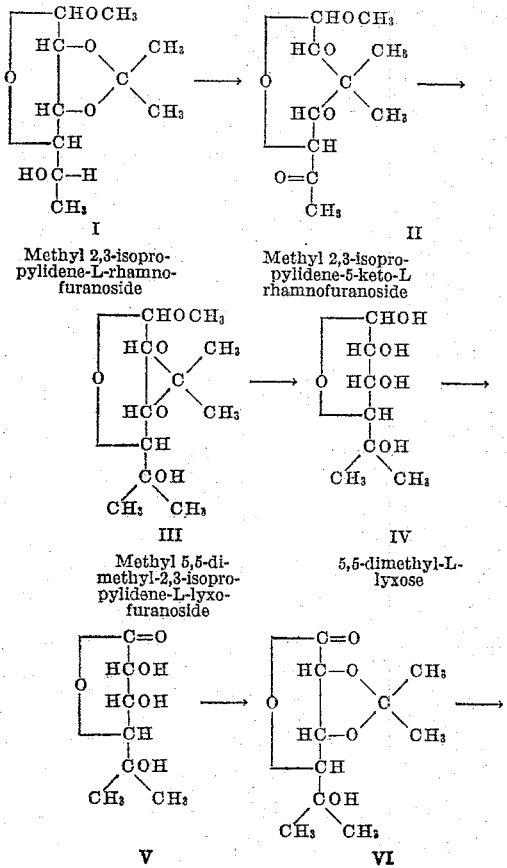

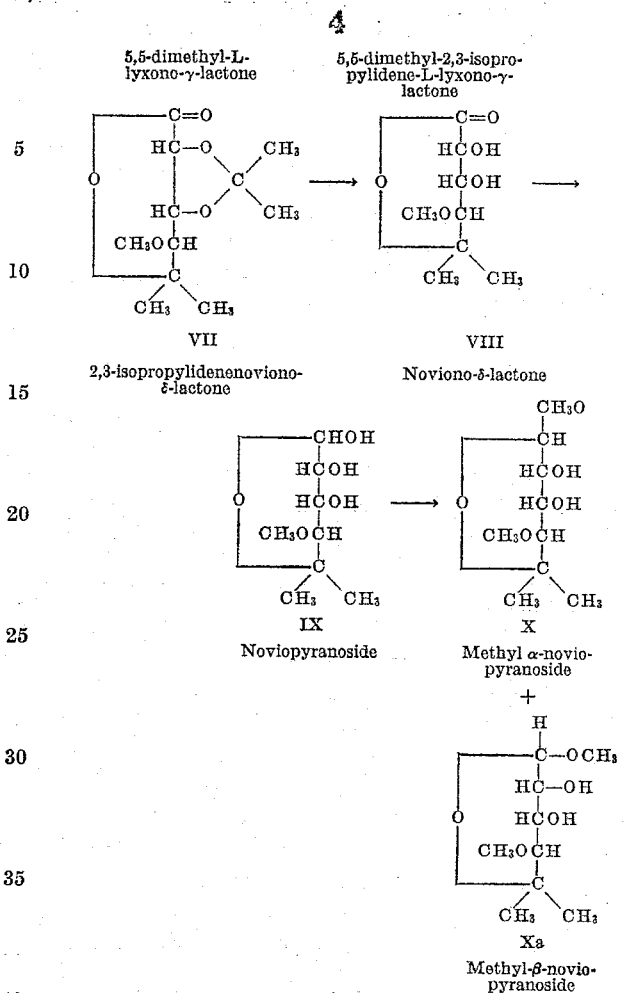

In the foregoing depicted reactions the starting material is first reacted with an oxidizing agent to produce methyl 2,3-isopropylidene-5-keto-L-rhamnofuranoside, which upon reaction with a methyl magnesium halide, is converted to methyl 5,5-dimethyl-2,3-isopropylidene-L-lyxofuranoside. This latter compound is then hydrolyzed by reaction with a non-oxidizing inorganic acid to obtain 5,5-dimethyl-L-lyxose which is then oxidized to produce 5,5-dimethyl-L-lyxono-γ-lactone. Conversion of 5,5-dimethyl-L-lyxono-γ-lactone to the corresponding 2,3-isopropylidene derivative and methylation of the sodium salt of this intermediate results in the production of 2,3-isopropylidenenoviono-δ-lactone. Upon hydrolyzing 2,3-isopropylidenenoviono-δ-lactone with a non-oxidizing inorganic acid noviono-δ-lactone is obtained. When noviono-δ-lactone is reduced by reaction with suitable reducing agents noviopyranoside is obtained, which upon methylation is converted to a mixture of methyl-α-noviopyranoside and methyl-β-noviopyranoside. The mixture of methyl-α-noviopyranoside and methyl-β-noviopyranoside can then be separated by fractional crystallization from suitable solvent mediums to produce methyl-α-noviopyranoside and methyl-β-noviopyranoside.

Various changes and modifications may be made in carrying out the present invention without departing from the spirit and scope thereof. Insofar as these changes and modifications are within the purview of the annexed claims, they are to be considered as part of our invention.

What is claimed is:

1. The process which comprises reacting methyl α-noviopyranoside with phosgene in the presence of an acid acceptor to produce methyl α-noviopyranoside 2,3-carbonate.

2. The process according to claim 1 wherein the acid acceptor is a tertiary amine.

3. The process according to claim 1 wherein the acid acceptor is pyridine.

4. The process which comprises reacting methyl α-noviopyranoside 2,3-carbonate with ammonia to produce methyl 3-O-carbamyl-α-noviopyranoside.

5. The process according to claim 4 wherein the reaction is carried out in methanol.

6. The process which comprises reacting methyl α-noviopyranoside with phosgene in the presence of an acid acceptor to produce methyl α-noviopyranoside 2,3-carbonate and reacting methyl α-noviopyranoside 2,3-carbonate with ammonia to produce methyl 3-O-carbamyl-α-noviopyranoside.

7. The process which comprises intimately contacting methyl-α-noviopyranoside with phosgene in the presence of pyridine to produce methyl-α-noviopyranoside 2,3-carbonate, and reacting methyl-α-noviopyranoside 2,3-carbonate with ammonia in methanol to produce methyl 3-O-carbamyl-α-noviopyranoside.

No references cited.